United States Patent [19]
Kasai et al.

[11] Patent Number: 5,523,685
[45] Date of Patent: Jun. 4, 1996

[54] METHOD AND APPARATUS FOR DETECTING PENETRANT METAL AND MEASURING THICKNESS OF REFRACTORY LINING

[75] Inventors: Kiyoto Kasai; Akio Ishii; Keisuke Asano, all of Futtsu; Shiro Sukenari, Oita, all of Japan

[73] Assignee: Nippon Steel Corporation, Tokyo, Japan

[21] Appl. No.: 14,571

[22] Filed: Feb. 8, 1993

[30] Foreign Application Priority Data

Feb. 7, 1992 [JP] Japan .................................. 4-022856
Feb. 7, 1992 [JP] Japan .................................. 4-022859

[51] Int. Cl.[6] .............................. G01B 7/06; G01R 33/12
[52] U.S. Cl. ...................... 324/229; 324/239; 324/234; 324/207.26; 164/4.1
[58] Field of Search .................................. 324/228, 229, 324/240, 226, 227, 204, 207.23, 230, 234, 236, 239, 207.26; 164/4.1

[56] References Cited

U.S. PATENT DOCUMENTS 4,859,940  8/1989  Hummert et al. ...................... 324/204

FOREIGN PATENT DOCUMENTS

| 56-55802 | 5/1981 | Japan . |
| 59-83004 | 5/1984 | Japan . |
| 59-083005 | 9/1984 | Japan . |
| 62-034003 | 7/1987 | Japan . |
| 63-053485 | 7/1988 | Japan . |
| 63-204108 | 12/1988 | Japan . |
| 1179889 | 10/1989 | Japan . |
| 2025687 | 4/1990 | Japan . |

OTHER PUBLICATIONS

UK Patent Application, Method and apparatus for measurement of shell of a metal casting, Jan. 1985, Application No. GB 2142729A.

Primary Examiner—Sandra L. O'Shea
Assistant Examiner—Jay M. Patidar
Attorney, Agent, or Firm—Pollock, Vande Sande & Priddy

[57] ABSTRACT

The present invention is a measuring method for detecting penetrant metal intruded in refractories having a conductive cover at a first wall and a nonconductive surface at a second wall and for measuring their thickness. At least one sensor head is used including a metal sensor with a first and second conductive coil for measuring distance between the sensor head and a conductive substance and a distance sensor for measuring distance between the sensor head and the refractories. The sensor head is disposed at a plurality of fixed positions close to the second wall to face the refractories and an alternating current is applied to the first coil to generate an eddy current in the conductive substance which faces the metal sensor. An induced voltage induced in the second coil by at least the eddy current is detected and a first distance is obtained between the sensor head and the conductive substance based on the detected induced voltage. The distance sensor measures a second distance between the sensor head and the second side wall at fixed positions and a third distance is obtained between the second side wall and the conductive substance. Also information is obtained about a relative position of the sensor head with respect to the molten metal vessel. A location and dimension of the penetrant metal and a thickness profile of the refractories is calculated based on the first, second and third distances and the relative position of the sensor head.

9 Claims, 5 Drawing Sheets

CENTER OF LADLE

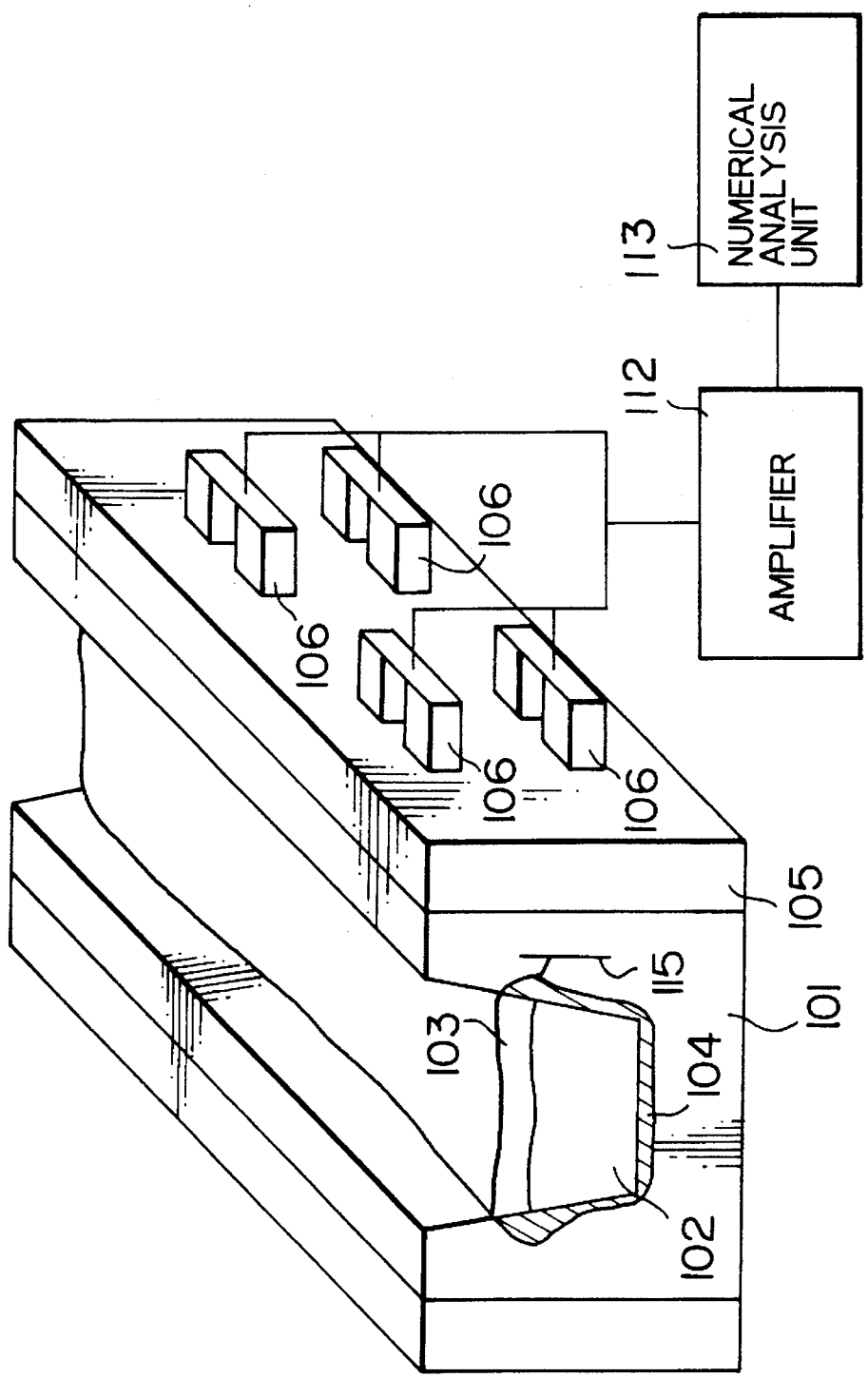
F I G. 5

METHOD AND APPARATUS FOR DETECTING PENETRANT METAL AND MEASURING THICKNESS OF REFRACTORY LINING

FIELD OF THE INVENTION

This invention relates to a method and an apparatus for detecting a thickness of refractories and penetrant metal in refractories in vessels for treating conductive molten metal, such as the furnace, transferring runner, conduit pipe or the like (hereafter referred to as the molten metal vessels) which have a conductive or nonconductive shell with a continuous flat or curved surface, the inside of which shell is lined with non-conductive refractories.

BACKGROUND OF THE INVENTION

Accurate measuring of the thickness of the refractory wall of a furnace vessel and detecting penetrant metal in the refractories are extremely important inspection items in the safety control and maintenance work of the refractories. A measuring apparatus using electromagnetic induction sensors on high-frequency current for obtaining refractory lining profiles of such a furnace vessel is disclosed in JPA-2-025687 by the present applicant, but this technique has a drawback that if a large amount of penetrant metal exists in the lining refractories, the electromagnetic waves are intercepted by the metal, and the refractory thickness cannot be measured accurately.

A method of automatically measuring the remaining lining thickness is disclosed in JPA 51-147510, for example, which uses waves such as laser light waves or microwaves to obtain the distance between the refractory wall and the wave generator based on the time duration or the phase difference of waves from the emission by the wave generator till the return to the wave generator after being reflected by the refractory wall, and based on changes of this distance, calculates the position and the amount of corrosion and the thickness of the refractory wall. However, this method is not used very often because of the inability to constantly fix the relation between the installed positions of the measuring apparatus and the vessel, and also because of a frequent occurrence of errors in measurement affected by dust or the fluctuation of the light derived from the long distance between the measuring point and the light source. Furthermore, the apparatus of this prior art, being designed for surface inspection, is unable to obtain information as to the penetrant metal.

JPA 62-34003 discloses an eddy current type electromagnetic sensor for detecting a conductive substance, that is, metal existing in the refractories. This sensor called NS Nippon Steel Metal sensor for detecting such a penetrant metal comprises two coils made by winding nonmagnetic conductors, that is to say, a wave transmitting coil and a wave receiving coil having a space between them and disposed at positions symmetric with respect to the axis of symmetry. The sensor is disposed to face the surface of the metal in a manner that the axis of symmetry is within ten degrees from the normal line to the surface of the metal.

When a high frequency a.c. current is conducted through the wave transmitting coil, a high frequency magnetic field (primary magnetic field) is produced, an eddy current is induced in an electric conductor to be detected, and a secondary magnetic field is produced by this eddy current. An induced voltage is generated in the wave receiving coil by a composite magnetic field made by the primary magnetic field and the secondary magnetic field, and this induced voltage is determined by the distance between the sensor head and the electric conductor. Therefore, when there is no metal in the refractories, the sensor detects the vessel shell or iron surface behind the refractories, and from this output voltage, the thickness of the refractories can be found.

If metal has intruded between the vessel shell and the sensor, an eddy current is produced in the surface of the metal. As the metal is closer to the sensor than the vessel shell, a greater output voltage is produced than the output voltage corresponding to the distance between the sensor and vessel shell when nothing other than the refractories exists between the sensor and the vessel shell. In this case, this output voltage is in a magnitude corresponding to the area and the depth of the metal.

In this way, metal existing in the refractories can be detected and measured, and on the basis of measurement results, the vessel can be overhauled or repaired before metal leakage occurs.

However, the above-mentioned sensor cannot measure the refractory thickness where there exists penetrant metal.

As described above, the conventional methods and apparatus cannot acquire accurate measurements of the refractory thickness and detect penetrant metal.

SUMMARY OF THE INVENTION

Therefore, it is an object of the present invention to provide a method and an apparatus for readily measuring the thicknesses of the lined refractories of molten metal vessels for treating molten metal, such as the furnace, ladle, runner, transferring conduit, pipe, and also for detecting a penetrant metal in the refractories.

The method and the apparatus for measuring the refractory thickness and for detecting penetrant metal include a metal detecting means, a refractory surface detecting means, a sensor position detecting means, and a function to analyze penetrant metal and refractory thickness. Those functions will be described in the following.

The metal detecting means, utilizing eddy current type electromagnetic sensors, that is, NS metal sensors which have a capacity to detect the presence of metal and measure the distance to the surface of the metal by sensing an eddy current induced at the surface of the metal existing in front of the sensor, detects the position, area, and shape of metal in the refractories by measuring the metal with a sensor head having the NS metal sensors by moving the sensor near the surface of the refractories or by using the sensors at fixed positions near the surface.

The refractory surface detecting means finds the distance from the sensor head detecting and measuring the metal to the surface of the refractories. In a case where the sensor heads are located at fixed positions, it is only necessary to store known values in a memory relating to each sensor, and in a case where a sensor head is moved to detect metal, a suitable mechanism is required to measure the distance between the sensor head and the refractory surface.

The sensor position detecting means finds the position of the sensor head with respect to the molten metal vessel. In a case where the molten metal vessel and sensor heads are installed at fixed positions, it is only necessary to store known values for each sensor in a memory. However, in a case where the sensor head is moved to detect metal even though the molten metal vessel is fixed at a stationary position, it is necessary to provide a mechanism to measure the position of the sensor head with respect to the molten metal vessel. This mechanism may work in synchronism with the moving mechanism of the sensor head, and finds the position of the sensor head from the distance traveled. When the molten metal vessel is a moving vessel such as a ladle and its position changes at each measurement, it is desirable for accurate measurement that a function to measure the position of the vessel is provided. This may be provided by a sensor located outside the vessel for measuring the shape of the outer surface of the shell, a meter for measuring the vessel position, a mechanism for adjusting the vessel position, or a mechanism for adjusting the sensor head position.

The fourth function to analyze penetrant metal and the refractory thickness receives detection data obtained by the metal detecting means, the refractory surface detecting means, and the sensor position detecting means, and by arithmetic operation on the data, finds the presence or absence, the position, and the shape of the penetrant metal in the refractories, and also finds the refractory thickness. Obtained data on the penetrant metal and the refractory thickness is displayed in numerical values and graphic forms on a display, printed on the printer, or stored in a memory and may be used as basic data for safety control and maintenance work of equipment. In addition, it is also possible to provide a means to transfer data to related equipment, such as the dismantling equipment and repairing equipment, and a host computer for equipment management.

The method and the apparatus for measuring the refractory thickness and detecting penetrant metal according to the present invention can be applied to molten metal vessels having nonconductive refractories lined on the inner side of the metal shell, such as various types of ladles, iron runners of blast furnace, tundishes or the like.

By drive units which perform the vertical and horizontal motions and the rotation of the arm independently of one another, an arm having the sensor head attached to its distal end is lowered into the inside of the vessel. The sensor head, placed to face the lining refractories, is moved along the surface of the refractory wall, and makes measurements of penetrant metal stopped at fixed positions. In this way, the penetrant metal if present in the refractories can be measured, and where there is no metal, the inner surface of the metallic shell can be detected, so that the refractory thickness can be measured. Moreover, by the method and the apparatus according to the present invention, the sensor head position with respect to the vessel, the amount of deformation of the vessel, or the like can be obtained accurately. Therefore, accurate measured values of the metal and the refractories can be obtained simultaneously, and the refractory profile can be obtained.

The detecting method and apparatus according to the present invention can be applied to molten metal vessels having refractories lined on the inner side of nonconductive shells, more specifically, a runner formed with a concrete outer shell is measured with the penetrant metal and the refractory thickness while molten metal flows through the runner.

The sensor head drive mechanism moves the sensor head in three dimensions in a plane located at constant distances away from the outer wall surface of the vessel. The NS sensor installed in the sensor head detects penetrant metal in the refractories. And where there is no metal, the sensor detects an eddy current induced in the surface of the molten metal in the vessel. Therefore, by using data thus collected, measurements can be made of the penetrant metal and the refractories. A plurality of the sensor heads may be fixed at stationary positions on the outer shell of the vessel, instead of moving a single sensor around the vessel wall.

By the detecting method and apparatus according to the present invention, it is possible to detect the presence and the depth of the penetrant metal, and also make an early discovery and accurate measurement of abnormal damage of the refractories. Therefore, it is possible to prevent a molten metal leakage and repair the damaged part with a minimum amount of a gunning refractories by confining the damaged part to a limited area, so that unit consumption of refractories can be decreased.

BRIEF DESCRIPTION OF THE DRAWINGS

FIG. 5 is a diagram showing a third embodiment of the present invention adapted to a runner.

DESCRIPTION OF THE PREFERRED EMBODIMENTS

Embodiments of the present invention related to a ladle and a runner will be described with reference to the accompanying drawings.

Figure 1:
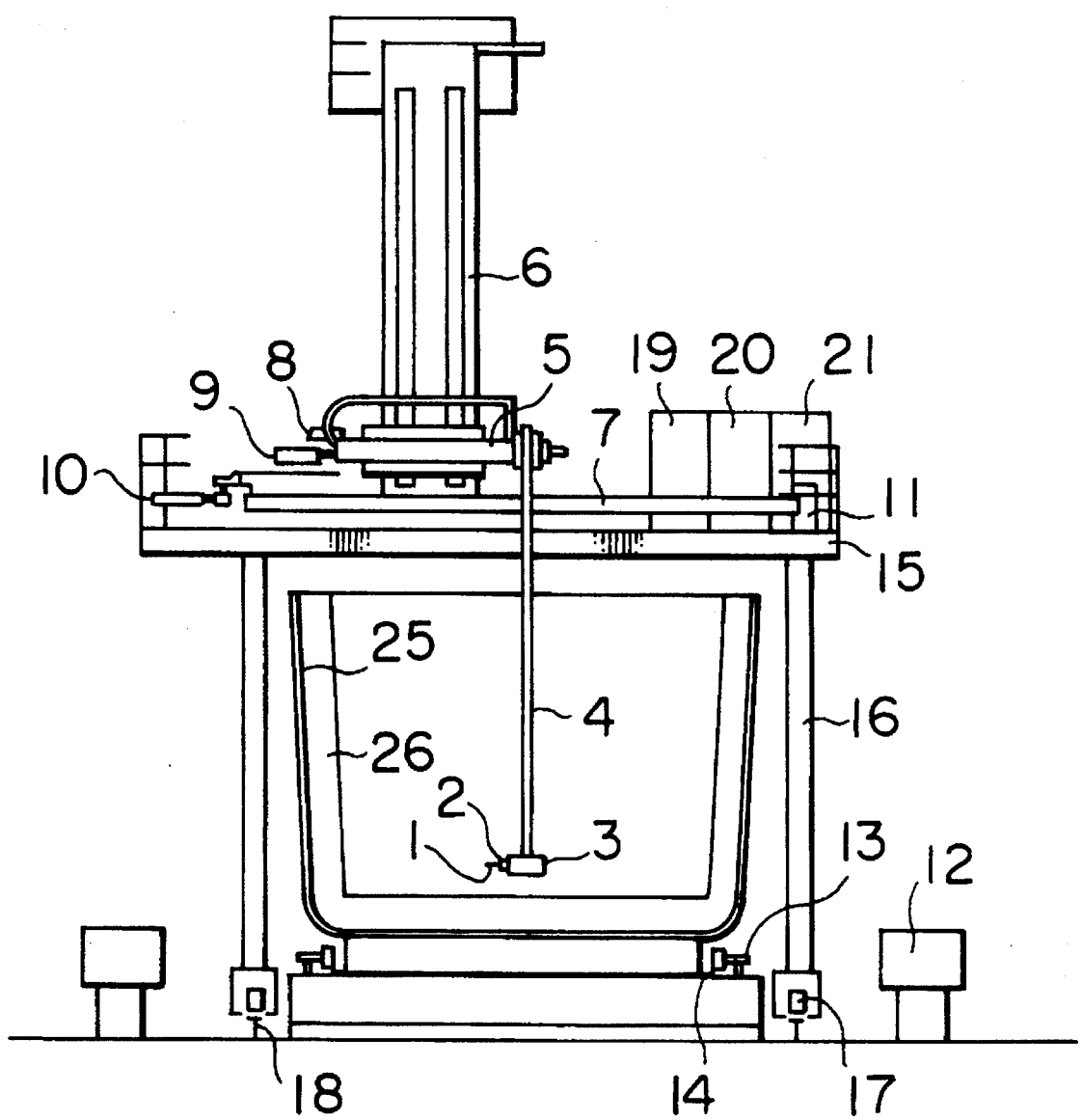
FIG. 1 is a diagram showing a first embodiment of the present invention applied to the ladle.

FIG. 1 is a first embodiment of the present invention showing a ladle covered with a conductive shell. In FIG. 1, the sensor head comprises three parts 1, 2 and 3. Numeral 1 denotes a distance measuring rod for measuring the distance between the sensor head and the refractories, 2 is an NS metal sensor, 3 denotes a sensor box having the NS sensor mounted at the front face thereof and also containing a differential transformer attached to the distance measuring rod 1, 4 denotes an arm, and 5 is a traversing frame for moving the sensor head in the radial direction of the ladle through the arm 4. This traversing frame is driven by a traverse motion motor 8 through a ball screw.

Numeral 6 denotes a lifting post for vertically moving the arm. The lifting post is movable by a rack and a pinion drived by a lifting motor 9 through a speed reducer. Numeral 7 denotes a rotating deck for turning the arm, and the rotating deck is rotated by a pin gear driven by a turning motion motor 10 through a speed reducer. Numeral 11 denotes cables, including cables for signals and a motive power, and a cooling air hose. Numeral 15 is a deck on which the above parts are mounted.

Laser measuring instruments 12 for measuring the ladle outer surface profile are installed at three positions in the circumferential direction. Oil cylinders 13 for centering the ladle are installed at three positions in the circumferential direction. Numeral 14 denotes a slider disposed under the bottom of the ladle for smooth movement in the ladle centering. Above the deck 15, there is also provided an operation panel 19. Numeral 16 denotes columns, 17 denotes wheels, and 18 is a rail for travel motion. The respective drive units are controlled by the operation panel 19 and a control panel 20. Numeral 21 denotes a numerical analysis unit which calculates the refractory thickness and the amount of corrosion, an adequate value of gunning refractory amount or the like by receiving outputs from the NS sensor and the differential transformer in the sensor head and other outputs from the laser measuring instruments. Numeral 25 denotes an outer shell of the ladle comprising a conductive substance and formed as a continuous flat surface, a curved surface, or a spherical surface. Numeral 26 denotes refractories.

Examples of the measuring procedures will be described next.

In FIG. 1, a molten steel ladle, conveyed by a crane or the like, is unloaded on the slider 14, and set at a specified position as the ladle bottom is pushed from the circumference by the oil cylinders 13. The arm 4 having the NS sensor 2 and the sensor box 3 connected to the distal end thereof is lowered into the vessel. While the sensor is moved over the vessel wall, the sensor output is measured and the distance between the sensor head and the ladle inner surface is measured, and measurement data is transferred to the numerical analysis unit 21. It is desirable that measurement by the NS sensor and measurement of the distance should be performed by the sensor head stopped at specific measuring points. In the NS sensor, output varies with the angle at which the NS sensor is opposed to the surface of the conductor to be detected, and therefore, this angle should preferably be less than ten degrees. In a case where the ladle has a vertically-straight but horizontally-curved surface, the sensor head is rotated about the axis of the arm. While on the other hand, in a case where the ladle has a spherical surface, a mechanism should preferably be provided which can tilt the sensor head with respect to the axis of the arm 4.

At the outside of the ladle, the ladle shell profile is measured from three directions by the laser distance measuring instruments for shell measurement, and data is transferred to the numerical analysis unit 21. The numerical analysis unit 21 calculates the refractory thickness from data including the amount of sensor head movement, and at the same time, determines and shows the position of the penetrant metal on the display.

Figure 2:
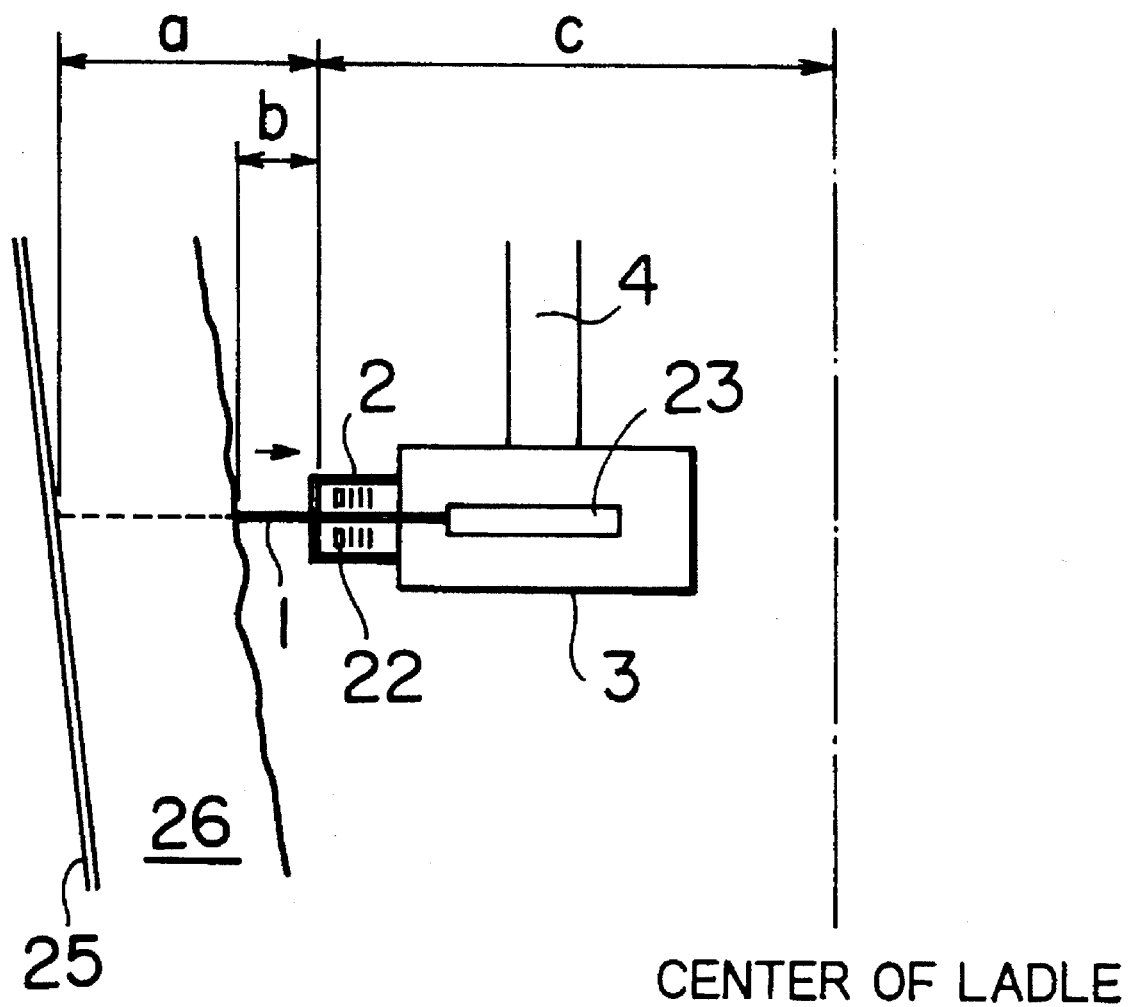
FIG. 2 is a diagram showing an example of the sensor head of the detecting apparatus of the present invention.

FIG. 2 is a sectional view showing the sensor head of the detecting apparatus of the present invention.

The sensor head is provided with the NS metal sensor and a distance measuring sensor unit including the distance measuring rod and the differential transformer. The distance measuring rod 1, connected to the differential transformer 23, passes between a pair of coils 22 of the NS metal sensor and protrudes therefrom. When the measuring rod contacts the wall surface, the sensor head measures an output voltage corresponding to the distance a to metal or the shell by the NS metal sensor, and an output voltage corresponding to the distance b between the sensor head and the ladle inner surface. The position of the sensor head is given as the distance c from the center of the ladle from the amount of movement effected by the drive unit. From measured values thus obtained, the thickness of the refractories 26 can be obtained. With regard to the portions of the refractories which are short of the set refractory thickness, information about those portions is fed back to the control panel, and according to this information, gunning repair is performed.

Figure 3:
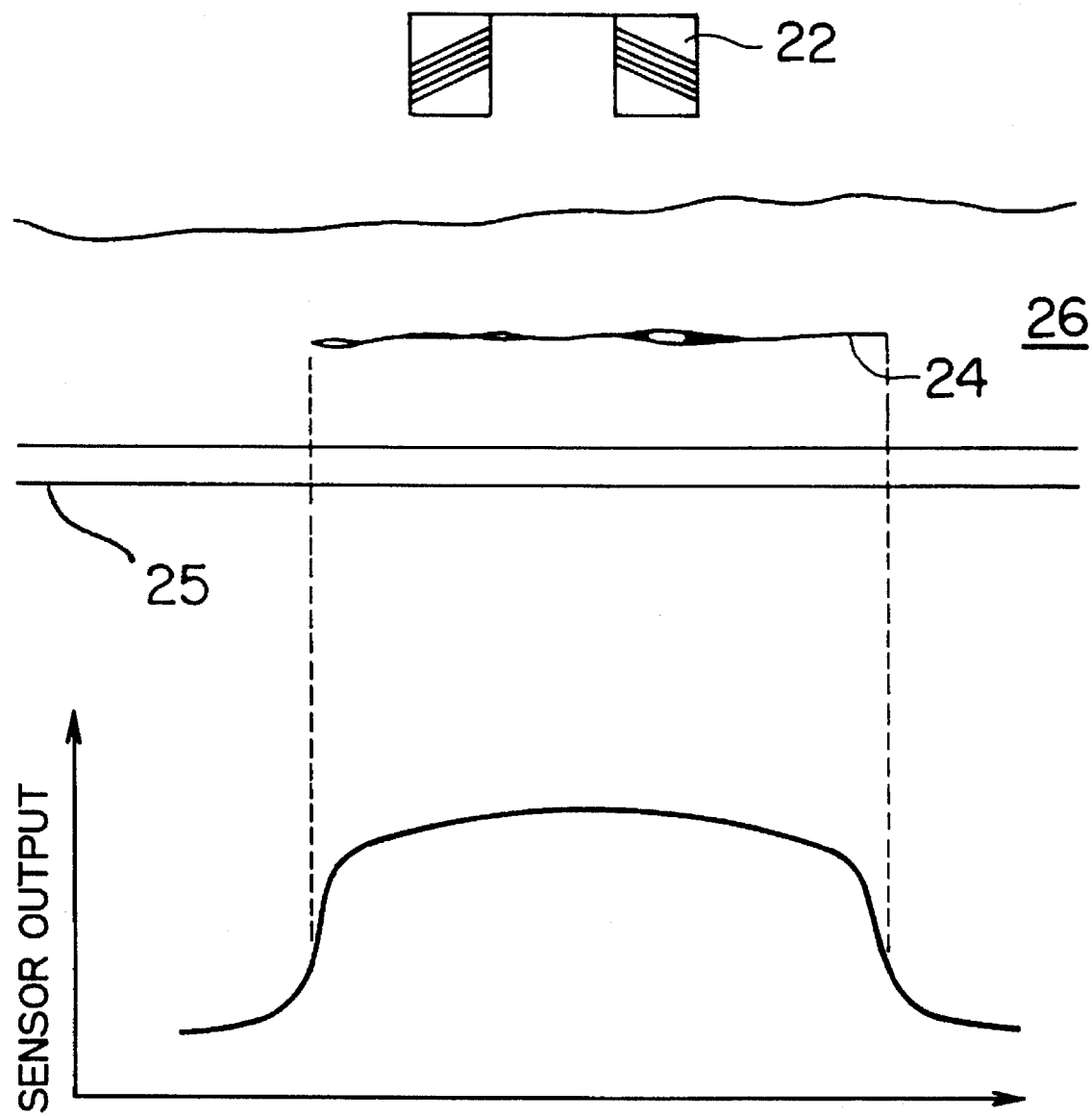
FIG. 3 is a diagram for explaining a sensor output when there is metal in the refractories.

A decision as to the presence of metal is made by comparing the refractory thickness calculated from differential transformer data and shell profile data with the refractory thickness measured by the NS sensor. For example, when there is penetrant metal 24 in the refractories 26 a sensor, output peak profile as shown in FIG. 3 can be obtained. If the measured thickness is too thin as compared with the refractory thickness calculated from the differential transformer data and shell profile data, a decision is made that there is penetrant metal in the refractories. On the other hand, if the two thickness values are the same, it is determined that that there is no penetrant metal in the refractory.

According to the measuring method and apparatus of this invention, the refractory thickness of the wall and the bottom of a molten metal vessel is determined in hot state and by nondestructive inspection. Also, the presence of penetrant metal can be found at an early stage, and therefore, the molten metal vessels can be put under a comprehensive furnace management system. Consequently, while a safe operation is performed free of metal leakage and falling off of part of refractories due to differential thermal expansion, the refractory wall can be repaired just to compensate for the corrosion detected, so that the melting loss balance of the whole vessel is kept, and the refractories can be used effectively.

More specifically, if this apparatus is used to measure a refractory wall profile to know the undulations of the worn furnace wall and repair the corroded portions, the molten metal vessel can be made to have a constantly uniform wall thickness, and repair materials are used in adequate amounts for right places, so that the furnace operation can be more economical in terms of unit consumption of repair materials.

In the conventional method of visually checking the corroded portions, the refractory wall thickness cannot be determined quantitatively, and accordingly, workers skilled in repair work are required. This invention enables persons unexperienced in repair work to determine the corroded portions.

Figure 4:
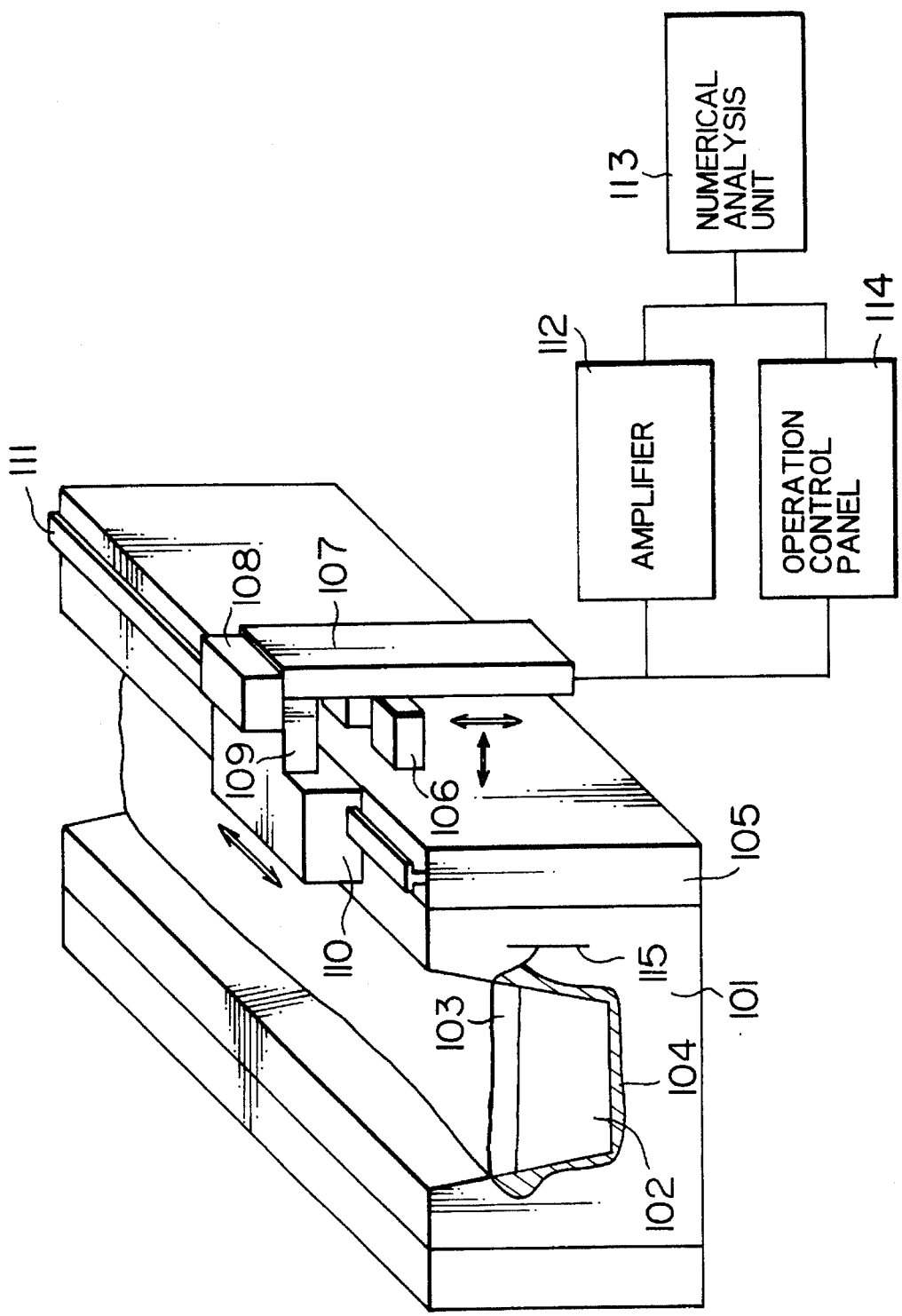
FIG. 4 is a diagram showing a second embodiment of the detecting apparatus of the present invention applied to an iron runner with a nonconductive shell.

FIG. 4 is a diagram showing a second embodiment in which the detecting apparatus of the present invention is applied to an iron runner having nonconductive walls.

In FIG. 4, numeral 101 denotes a runner lined with refractories, 102 denotes molten iron, 103 denotes slag, 104 denotes corroded portions, 105 denotes a concrete outer wall, 106 denotes the NS sensor, 107 denotes a guide for lifting, 108 denotes a motor for lifting motion, 109 denotes a guide for horizontal travel, 110 denotes a motor for movement in upstream and downstream directions of the runner, and 111 denotes a rail for travel motion, and the sensor drive unit travels on this rail. Numeral 112 denotes an amplifier for amplifying sensor output. Numeral 113 denotes a numerical analysis unit (personal computer), and 114 denotes an operation control panel from which the drive unit is operated.

The measuring procedure will now be described.

In FIG. 4, the sensor drive unit moves in the upstream and downstream directions on the rail installed on the concrete shell wall of the runner. The NS sensor is attached to the lifting guide of the unit, and the NS sensor moves vertically keeping its fixed distance with respect to the concrete shell. While moving, the NS sensor makes measurements, and inputs data into the personal computer through the amplifier. Also, data on position of the drive unit is supplied from the control panel to the personal computer.

The personal computer calculates the distance from the sensor to the conductor detected, such as pig iron 102 or penetrant metal 115 from supplied data, and displays results on a CRT. In this way, at the portions of the wall where there is no penetrant metal, the refractory thickness can be known, and at the other portions of the wall where there is penetrant metal, the distance to the penetrant metal can be measured. By comparison with data as to the region around the metal, the presence or absence of the penetrant metal, and the conditions of its existence, such as the area and the depth of the metal can be clarified.

For example, in the use of a main iron runner in a blast furnace, the runner is conventionally overhauled and repaired when the quantity of pig iron which has passed through the runner has amounted to about 60 thousand tons. It has become apparent that the average quantity of pig iron passed through the runner without repair is increased to 90 thousand tons in such a way of runner operation in which safety is continually checked by using the above method of making measurements while the pig iron is passed through the runner, so that the unit consumption of refractories can be decreased.

FIG. 5 is a diagram showing a third embodiment in which the detecting apparatus of this invention is applied to the iron runner.

In a case where the sensor drive unit cannot be installed because there is short space in the surface of the shell wall or for some other reasons, a plurality of NS sensors 106 are fixed on the outer surface of the wall as shown in FIG. 5, and data obtained by those sensors 106 is input to a personal computer for management of the iron runner. Since the NS sensors are located at fixed positions, it is possible to obtain a refractory thickness profile and monitor the refractories to check for any penetrant metal 115.

An effect of the present invention is that since the furnace wall refractory thickness can be obtained and early discovery of penetrant metal can be done on-line in hot-working condition, the facilities to be put under surveillance can be placed under a comprehensive furnace management system. More specifically, the worn amount of refractories and the locations where there is penetrant metal can be monitored at all times while the furnace operation is continued. Therefore, a safe operation without worry about a metal leakage accident can be implemented and the lining refractories can be used until its limit of use.

In the conventional method of determining the worn portions by visual inspections, the furnace refractory thickness cannot be determined quantitatively, so that workers skilled in the work are required. This invention enables the furnace management to be executed by computer, which brings about additional labor savings.

We claim:

1. A measuring method for detecting penetrant metal intruded in refractories having a conductive cover at a first side wall and a nonconductive surface at a second side wall and for measuring thickness of said refractories by using at least one sensor head including a metal sensor for measuring a distance between said sensor head and a conductive material which faces said sensor head, said conductive material including said conductive cover and said penetrant metal, if present, and a distance sensor for measuring a distance between said sensor head and the second side wall of said refractories, said metal sensor having a first inductive coil and a second inductive coil disposed with a space therebetween, said method comprising the steps of:

disposing said sensor head at a plurality of predetermined positions in a vicinity of the second side wall of said refractories so that said sensor head faces said refractories;

applying an alternating current to the first inductive coil to generate an eddy current in said conductive material;

detecting a voltage induced in the second inductive coil due to at least said eddy current;

obtaining a first distance between said sensor head and said conductive material at said plurality of predetermined positions based on the detected voltage;

measuring a second distance between said sensor head and the second side wall of said refractories at said plurality of predetermined positions by using said distance sensor;

obtaining a third distance between the second side wall of said refractories and said conductive material at said plurality of predetermined positions;

measuring an outside profile of said first side wall of said refractories with a plurality of measuring means facing said first side wall to obtain information about a relative position of said sensor head at said plurality of predetermined positions with respect to said refractories; and calculating a location and a dimension of said penetrant metal, if present, and a thickness profile of said refractories based on said first, second and third distances and said information.

2. The measuring method according to claim 1, wherein said conductive cover at the first side wall of said refractories is formed by an outer shell which is lined outside of said refractories.

3. The measuring method according to claim 1, wherein said conductive cover at the first side wall of said refractories is formed by metal contained in said refractories.

4. A measuring method for detecting penetrant metal intruded in refractories lined inside of a molten metal vessel having a conductive shell and for measuring thickness of said refractories by using at least one sensor head including a metal sensor for measuring a distance between said sensor head and a conductive material which faces said sensor head, said conductive material including said conductive shell and said penetrant metal, if present, and a distance sensor for measuring a distance between said sensor head and an inner surface of said refractories, said metal sensor having a first inductive coil and a second inductive coil disposed with a space therebetween, said method comprising the steps of:

disposing said sensor head at a plurality of predetermined positions in a vicinity of the inner surface of said refractories so that said sensor head faces said refractories;

applying an alternating current to the first inductive coil to generate an eddy current in said conductive material;

measuring a voltage induced in the second inductive coil due to at least said eddy current;

obtaining a first distance between said sensor head and said conductive material at said plurality of predetermined positions and detecting presence of said penetrant metal induced in said refractories based on the detected voltage;

measuring a second distance between said sensor head and the inner surface of said refractories at said plurality of predetermined positions by using said distance sensor to obtain an inside profile of said refractories from a compile of said second distances at said plurality of predetermined positions;

disposing a plurality of sensing means outside of said molten metal vessel and sensing an outside profile of said molten metal vessel by using said sensing means; and obtaining a thickness profile of said refractories based on said inside profile and said outside profile.

5. The measuring method according to claim 4, wherein said outside profile is measured in advance and stored in a memory, and said inside profile is obtained based on an outer surface of said molten metal vessel.

6. The measuring method according to claim 5, further comprising the step of measuring deviations of said outer surface sensed by said sensing means from a predetermined reference position, and wherein said thickness profile of said lining refractories is calculated taking into account said deviations.

7. The measuring method according to claim 4, wherein said outside profile is generated by measuring distances between an outer surface of said molten metal vessel and said sensing means at a plurality of reference positions located outside of said molten metal vessel.

8. The measuring method according to claim 4, wherein an outer surface of said molten metal vessel is shaped with at least one of a flat plane, a curved plane and a spherical plane in a continuous form.

9. A measuring apparatus for detecting penetrant metal intruded in refractories lined inside of a molten metal vessel having a conductive shell and for measuring thickness of said refractories, said apparatus comprising:

at least one metal sensor having a first coil and a second coil disposed with a space therebetween for sensing metal, wherein said second coil generates an induced voltage depending on existence of a conductive material which faces said metal sensor while an alternating voltage is applied to said first coil, said metal sensor being disposed at a plurality of predetermined positions in a vicinity of an inner surface of said refractories to face said refractories;

at least one first distance sensor for producing a first output which depends on a distance between the inner surface of said refractories and said first distance sensor at said plurality of predetermined positions;

at least one second distance sensor for producing a second output representative of an outside profile of said molten metal vessel which depends on a distance between an outer surface of said molten metal vessel and said second distance sensor at a plurality of reference positions set outside of said molten metal vessel; and an analysis unit having an arithmetic processing device and a display device, said arithmetic processing device receiving the induced voltage from said metal sensor and the first and second outputs from said first and second distance sensors to calculate thickness of said refractories and detect presence of said penetrant metal intruded in said refractories based on said induced voltage and said first and second outputs, and said display device indicating the thickness of said refractories and the presence of said penetrant metal.

* * * * *